June 19, 1956            J. M. URITIS            2,750,961
VALVE ACTUATING MECHANISM
Filed Sept. 28, 1951
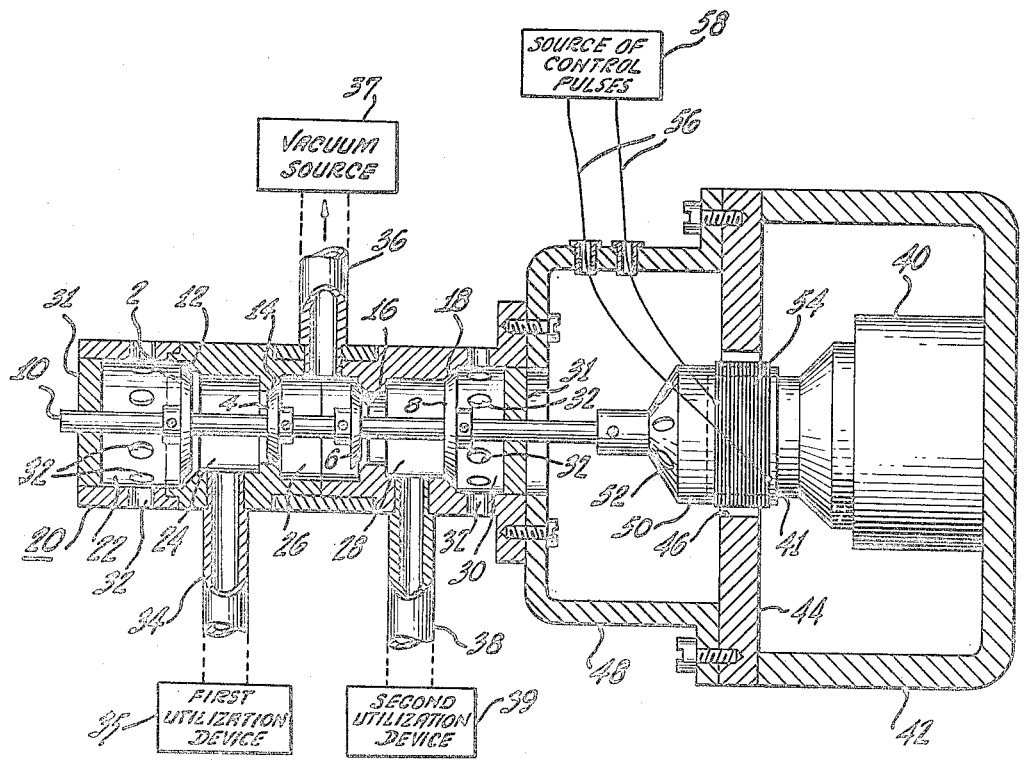
INVENTOR
JOSEPH M. URITIS
BY
ATTORNEY

2,750,961

Patented June 19, 1956

2,750,961

VALVE ACTUATING MECHANISM

Joseph M. Uritis, Haddon Township, Camden County, N. J., assignor to Radio Corporation of America, a corporation of Delaware Application September 28, 1951, Serial No. 248,767

1 Claim. (Cl. 137—625.5)

This invention relates to valving systems, and more particularly to high speed valve actuating mechanisms.

There frequently arises a need for fast acting valves to control the flow of a fluid. One situation in which such need appears is in high speed computing equipment. For example, data is stored on magnetic record tape. The tape is driven past a pick-up head at a high linear speed, say one hundred inches per second. It has been found desirable to be able to stop the motion of the tape very quickly from full speed to dead stop in around five milliseconds or less. It is also desirable to be able to start the motion of the tape equally fast. A capstan, which is used to drive the tape, usually has a heavy flywheel coupled to it for assuring a smooth movement of the tape while it is in motion. It therefore appears that attempts to stop the motion of the tape by applying a braking force to the capstan would be much too slow. Since the reels upon which the tape is wound also have a relatively high inertia, braking forces applied to them would also be too slow.

To provide means whereby such fast starts and stops may be accomplished, a system was designed at the Harvard University Computation Laboratory. That system involves the use of a vacuum pump which may be connected, through a suitable valve, to either a rotating capstan or an adjacent fixed shoe. The tape follows a path which leads between the capstan and the shoe. Both of these instrumentalities have a plurality of ports which may be selectively connected to the vacuum pump. When the vacuum pump is connected through the valve to the capstan, the tape is held against the capstan by the difference in air pressure appearing on its opposite sides. The tape is thereby driven at the surface speed of the capstan. However, when the shoe is thereafter connected to the vacuum system, the tape is moved from engagement with the capstan and adheres tightly to the shoe, stopping the tape motion almost instantly. When the valve is actuated to again connect the capstan to the vacuum system, the tape is released from the shoe and it again engages the capstan, substantially instantaneously acquiring full speed. The means employed to actuate the valve must respond very quickly to whatever signaling means is used to indicate the starts and stops, since the accuracy and speed of the starts and stops of the tape can be no better than the valve actuating means.

It is, accordingly, an object of the present invention to provide an improved valve actuating mechanism for high speed vacuum valving systems such as may be used with tape handling apparatus.

A further object of the present invention is to provide a valve actuating mechanism as aforesaid in which the valve is actuated substantially instantaneously in response to electrical pulse signals.

Still another object of the present invention is to provide an actuating mechanism as set forth which is particularly suited for use with valves of the poppet-type.

In accordance with the present invention, a plurality of poppet-type valves are arranged along a common axis and have a common operating rod or stem. There is provided an electrodynamic motor or driver unit which includes a magnetic field producing means defining an air gap. A coil is movably supported in that air gap and is mechanically coupled to the common operating rod. Signals in the form of electrical pulses are applied to the winding of the movable coil. These signals cause the coil to move substantially instantaneously in a direction determined by the polarity of the field and of the pulses. The movement of the coil causes a corresponding movement of the valves.

A better understanding of the present invention may be had from the following detailed description when read in connection with the accompanying drawing in which the single figure is a view, partly in section, of an embodiment of the present invention.

Referring, now, to the drawing in more particularity, there is shown a valve assembly which includes a plurality of coacting valves 2, 4, 6 and 8. The valves are each secured to a common operating rod or stem 10. There are provided corresponding valve seats 12, 14, 16 and 18, respectively, for each of the valves. A casing 20 in which the valves operate is divided into several chambers 22, 24, 26, 28, and 30. These chambers are connected, successively, to one another through a series of openings defined by the valve seats. However, the valves may be operated to block certain of these openings, isolating selected ones of these chambers from the others. The two end walls 31 of the casing 20 constitute bearings for the valve operating rod 10, supporting the rod axially of the casing while permitting movement of the rod in an axial direction with respect to the casing. In the drawing, it may be seen that the first of these chambers 22 and the last one 30 are open to the surrounding atmosphere through a plurality of ports 32. These ports are open and remain open at all times. The second chamber 24 is connected, by a suitable conduit 34, to a first utilization device 35 which may be the fixed shoe discussed previously in the illustrative example. The third, or center, chamber 26 is connected, by a suitable conduit 36, to a vacuum source 37. The fourth chamber 28 is connected, again by a suitable conduit 38, to a second utilization device 39 which may be the capstan of the example mentioned above.

The motor or driver unit includes a means 40 for producing a unidirectional magnetic field. The means may be either a permanent magnet or an electromagnet. To the field producing means is secured a soft iron pole piece 41. The magnetic flux path is completed through a soft iron casing 42 in which the field producing means is mounted. The casing includes a cover member constituting a pole cap 44 having a central opening 46. The opening 46 is somewhat greater in diameter than the pole piece 41 which protrudes therethrough. There is thus formed a substantially annular air gap between the pole cap and the pole piece. An intermediate frame member 48 secures the casing 20 to the casing 42 in such position that the annular air gap is substantially coaxial with the valve operating rod 10.

There is a cylindrical coil form 50 made of light, insulating material secured, by means of a spider 52, to the end of the operating rod nearest the motor unit. The cylindrical form extends through the annular air gap between the pole cap and the pole piece. On this cylindrical form, there is wound a coil 54 having a pair of leads 56. The coil thus wound on the form is positioned in the magnetic field established in the air gap. Connected to the leads of the coil is a source of electrical control pulses 58.

It may now be seen that, if an electrical pulse is applied to the windings of the coil 54, the interaction between the magnetic field due to the field producing means 40 and that due to current flowing through the coil 54 will tend to cause the coil to move in a direction determined by the polarity of the field resulting from the pulse and that of the unidirectional field.

Assume that the valve is in the position shown in the drawing, that is, closed toward the left. The first valve is open, permitting the atmospheric pressure present in the first chamber 22 to be applied, through the second chamber 24, to the first utilization device 35. The second valve is closed, isolating the second chamber from center chamber 26. The third valve is open, allowing the vacuum established in the center chamber to be applied, through the fourth chamber 28, to the second utilization device 39, the fourth valve being closed, isolating the fourth chamber from the atmospheric pressure in the fifth chamber 30. If, then, a pulse of proper polarity is applied to the windings of the coil 54, the coil, and all that is secured to it, will move to the right. When the operating rod and its associated valves are moved to the right, the first and third valves will be closed and the second and fourth valves will be opened. In that condition, the vacuum will be applied to the first utilization device while atmospheric pressure will be admitted to the second device.

While any suitable means, such as springs and the like, may be used for biasing the valves and their operating rod, in the illustrated embodiment of this invention, the biasing force is obtained from unbalanced air pressure on the surfaces of the valves. It may be seen, in the drawing, that the two outer valves are larger than the two inner valves. In the position shown in the drawing, atmospheric pressure is acting in opposite directions against the second and fourth valves. Since the area of the fourth valve is greater than that of the second, the force applied to the fourth valve prevails until overpowered by the action of the motor unit. After having been moved to the right by the action of the motor, the rod and valves are maintained in that position by the unbalanced air pressure bias, since the prevailing force will be acting against the surface of the first valve. Thus, the biasing force acts as an over-center device, serving to maintain the valves in the position to which they were last driven by the motor. Under that condition, the valves may be actuated by pulses of the desired polarity to effect the desired shift in position, a single pulse being sufficient to produce each shift. Therefore, it is not necessary to subject the coil to a sustained electric current in order to maintain the valves in the desired position.

It may now be seen that there has been provided a simple and improved valve actuating mechanism in which the valve is actuated substantially instantaneously in response to electrical pulse signals.

What is claimed is:

A high-speed valving system comprising in combination, a valve body having valve controlled passages therethrough, a plurality of poppet-type valves for controlling said passages, a common operating rod for said valves for moving said valves to either of two predetermined positions, an overcenter biasing means for said valves for biasing said valves into either of said two positions, and an electrodynamic motor unit coupled to said rod for effecting the operation of said valves, said motor unit comprising means for producing a unidirectional magnetic field and including means defining an annular air gap in said magnetic field, a coil, means including said operating rod for supporting said coil in and substantially coaxially with said annular air gap, and means electrically connected to said coil for applying electrical pulses of selected polarity to said coil, said coil being responsive to coaction between said pulses and said field to produce motion of said coil in one direction in response to a pulse of one polarity and in the opposite direction in response to a pulse of the opposite polarity whereby to operate said valves in response to the application of the pulses to said coil.

References Cited in the file of this patent

UNITED STATES PATENTS

| | | |
|---|---|---|
| 387,310 | Mather | Aug. 7, 1888 |
| 1,063,632 | White et al. | June 3, 1913 |
| 1,452,600 | Hapgood | Apr. 24, 1923 |
| 1,833,914 | Ruben | Dec. 1, 1931 |
| 2,436,992 | Ernst | Mar. 2, 1948 |
| 2,637,343 | Matthews | May 5, 1953 |